United States Patent
Wang

(10) Patent No.: US 7,166,941 B2
(45) Date of Patent: Jan. 23, 2007

(54) ELECTROPLATED STATOR BAR END AND FITTING

(75) Inventor: Yu Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/990,958

(22) Filed: Nov. 18, 2004

(65) Prior Publication Data
US 2006/0103244 A1 May 18, 2006

(51) Int. Cl.
*H02K 9/00* (2006.01)
(52) U.S. Cl. .................. 310/54; 310/52; 310/260
(58) Field of Classification Search ............ 310/260, 310/52–65, 195–208
See application file for complete search history.

(56) References Cited

U.S. PATENT DOCUMENTS

| | | | |
|---|---|---|---|
| 3,614,493 A | 10/1971 | Collings et al. | 310/54 |
| 3,922,396 A * | 11/1975 | Speirs et al. | 148/529 |
| 3,978,359 A | 8/1976 | Kultzow et al. | 310/260 |
| 4,122,870 A * | 10/1978 | Hines | 138/109 |
| 4,199,700 A | 4/1980 | Daugherty et al. | 310/71 |
| 4,274,021 A | 6/1981 | Kamiya et al. | 310/54 |
| 4,305,792 A | 12/1981 | Kedward et al. | 205/109 |
| 4,806,807 A | 2/1989 | Levino | 310/71 |
| 4,912,831 A | 4/1990 | Levino | 29/596 |
| 4,982,122 A | 1/1991 | Rowe et al. | 310/54 |
| 5,059,493 A * | 10/1991 | Takahata | 428/658 |
| 5,304,877 A | 4/1994 | Baek | 310/45 |
| 5,316,801 A | 5/1994 | Hopeck | 427/486 |
| 5,423,473 A | 6/1995 | Dailey et al. | 228/44 |
| 5,528,827 A | 6/1996 | Dailey et al. | 29/890 |
| 5,557,837 A | 9/1996 | Thiard-Laforet et al. | 29/596 |
| 5,581,869 A | 12/1996 | Travaly | 29/596 |
| 5,605,590 A | 2/1997 | Manning et al. | 156/94 |
| 5,659,944 A | 8/1997 | Thiard-Laforet | 310/54 |
| 5,875,539 A | 3/1999 | Kilpatrick et al. | 29/596 |
| 6,031,751 A * | 2/2000 | Janko | 363/144 |
| 6,124,659 A | 9/2000 | Rowe et al. | 310/214 |
| 6,276,726 B1 * | 8/2001 | Daspit | 285/15 |
| 6,372,116 B1 | 4/2002 | Kim et al. | 205/205 |
| 6,447,167 B1 | 9/2002 | Kashiwada et al. | 384/100 |
| 6,778,053 B1 | 8/2004 | Irwin et al. | 335/296 |
| 6,800,971 B1 * | 10/2004 | Mangold et al. | 310/52 |
| 6,969,932 B2 * | 11/2005 | Kim et al. | 310/59 |
| 2005/0012408 A1 * | 1/2005 | Kim et al. | 310/54 |
| 2006/0061220 A1 * | 3/2006 | Kim et al. | 310/54 |

OTHER PUBLICATIONS

Cybershield, Inc. "Cybershield Electroless Plating"; 2002; 2 pages; http://www.ccoatings.com/electroless.cfm.
Cybershield, Inc. "Electroless Plating"; no date; 1 page; http://www.ccoatings.com/electroless_plating.html.

(Continued)

*Primary Examiner*—Dang Le
(74) *Attorney, Agent, or Firm*—Nixon & Vanderhye PC

(57) ABSTRACT

The interior of a stator bar clip that is joined to the end of a stator bar is electroplated so that a metallic barrier coating overlies the braze joint between the stator bar and the clip to define a seal at and around the joint that is substantially impermeable to liquid.

2 Claims, 4 Drawing Sheets

OTHER PUBLICATIONS

Surface Solution; "Electroless Plating"; no date; 1 page; http://www.surfacesolution.com/ElectrolessPlating.html.

Mario S. Pennisi; Powder Coating; Finishing dot com; no date; 5 pages; http://www.finishing.com/Library/pennisi/powder.html, Nov. 18, 2004.

All About Powder Coating for Dummies; "All About Powder Coating & Frequently Asked Questions"; no date; 6 pages; http://www.arizonapowder.com/allaboutpc.html, Nov. 18, 2004.

Dave Wright; "Powder Coating for Motorcycles"; Apr. 25, 1997; 13 pages; http://www.execpc.com/~davewrit/Powder.html.

U.S. Application of Mall et al; U.S. Appl. No. 10/983,673; "Powder Coating of Liquid Cooled Stator Box"; filed Nov. 9, 2004.

U.S. Application of Wang et al; U.S. Appl. No. 10/822,872; "Epoxy Spray Lining for Liquid-Cooled Generator Stator Bar Clips"; filed Apr. 13, 2004.

U.S. Application of Wang et al; U.S. Appl. No. 10/900,184; "Metallic Barrier Coating for Liquid Cooled Generator Stator Bar Clips"; filed Jul. 28, 2004.

U.S. Application of Wang; U.S. Appl. No. 10/978,478; "Electroless Metallic Plating Method for Leak Repair and Prevention in Liquid-Cooled Generator Stator Bars"; filed Nov. 2, 2004.

* cited by examiner

ELECTROPLATED STATOR BAR END AND FITTING

BACKGROUND OF THE INVENTION

Water-cooled stator bars for electrical generators are comprised of a plurality of small rectangular solid and hollow copper strands brazed to one another to form a bar. The ends of the strands are brazed to an end fitting, typically referred to as stator bar clip. A cover is brazed to the clip window. The end fitting serves as both an electrical and a cooling flow connection for the stator bar.

The hollow end fitting typically includes an enclosed chamber for ingress or egress of stator bar cooling liquid, typically deionized water. At one end, the end fitting receives the ends of the strands of the stator bar. The fitting and the peripherally outermost copper strands of the stator bar are brazed to one another. The opposite end of the fitting is connected to a stator cooling conduit.

Liquid cooled stator bar clips have gone through design changes over the years. However, they typically contain mixed solid and hollow strands brazed to one another, and a cover brazed to a clip window. During operation, the hollow strands carry water to cool off the bar. Over time, leaks can develop about the connection between the stator bar ends and the stator bar fitting, between cover and clip as well as between adjacent strands. Leaks may also occur at various plumbing connections. It is believed that the major leak mechanism is a crevice corrosion process which initiates in the braze alloy at the interior surface of the braze joint. Crevice corrosion is a localized form of corrosion usually associated with a stagnant solution on the microenvironmental level. Such stagnant microenvironments tend to occur in crevices such as micro surface voids formed during brazing, especially at the boundary of strands and braze alloy. Crevice corrosion is initiated by changes in local chemistry within the crevice, such as shift to phosphorous acid conditions in the crevice. Stagnant water in the chamber of the fitting is in contact with the braze alloy and the copper strands. This coolant contact with the braze joint and cooper strands is believed to cause corrosion and consequent leakage.

Field repair of coolant leaks through the stator bar end connections has been successful. A leak site is identified by several different tests, such as vacuum decay and traceable Helium test.

An epoxy barrier coating method has been used as a leak repair and prevention method. An example of an epoxy barrier coating method is disclosed in U.S. Pat. No. 5,605,590, the disclosure of which is incorporated herein by this reference. This epoxy barrier coating has been applied to provide protection against water initiated corrosion mechanisms along the brazed length of the strand package. Epoxy coating is manually injected. The voids and air pockets are possible during injection. Thus, the process is labor intensive and requires 100% inspection. As a result, the process can be labor intensive, takes a long time to complete, and can produce defects.

There are also other leak issues in liquid cooled generators. Indeed, there are many types of leaks associated with water-cooled generators. Stator bar end crevice corrosion is the major one. But other leaks are caused by porosity, cracking and localized damage during manufacturing rather than as a result of corrosion.

There is a need for an improved method for leak repair and prevention in liquid-cooled generators. In particular, there is a need for corrosion protection at the junction between the stator bars and their clips. The corrosion protection should be robust and be applicable to various stator bar clip designs, including clips for recessed braze, flush braze and raised hollow strand braze designs. There is also a need for an improved method to repair and prevent leaks within the generator water pass that arise from other causes.

BRIEF DESCRIPTION OF THE INVENTION

The invention proposes an electroplating method to deposit a thin layer of metallic barrier coating on a part of or the entire interior surface of a liquid-cooled stator bar clip. The metallic layer provides a corrosion resistant barrier coating to prevent water access to corrosion susceptible region(s) such as clip-to-strand braze joints. Different materials may be deposited, such as copper or nickel as the metallic barrier coating.

Thus, the invention may be embodied in an apparatus for electroplating an interior of a component, comprising: an inflow tube for flowing electroplating solution to an interior of said component; an outflow tube for flowing electroplating solution out of an interior of said component; a pump for conducting electroplating solution through said inflow tube and for drawing said electroplating solution through said outflow tube; an anode disposed in said electroplating solution and electrically connected to a power supply; and said component being electrically connected to said power supply as a cathode.

The invention may also be embodied in a method of sealing a stator bar with an interior liquid pass for flow of coolant forming at least a portion of said stator bar, comprising electroplating at least a portion of an interior wetted surface of said stator bar.

The invention may also be embodied in a method of sealing interior surfaces of a fitting receiving a stator bar end, to define a seal substantially impermeable to liquid, the fitting having a chamber for receiving a liquid through an opening in the fitting and said chamber being in communication with hollow strands forming at least a portion of said stator bar, said method comprising the steps of: disposing an electroplating solution in said chamber; disposing an anode of the metal or metal alloy to be deposited in said electroplating solution; connecting said anode to the positive terminal of a current source as a cathode; electrically connecting said stator bar to the negative terminal of said current source; and establishing an electrical potential between said anode and said cathode to initiates migration of metal ions from the anode to the electrically conductive inner surface of the component.

The invention is also embodied in stator bar end and a fitting receiving the end to define a seal substantially impermeable to liquid, the fitting having a chamber for receiving a liquid through an opening in the fitting and in communication with hollow strands forming at least a portion of said stator bar and for flow of the liquid through the hollow strands, wherein at least a portion of an interior surface of said fitting has a metallic layer disposed thereon, wherein said metallic layer is deposited by electroplating.

DETAILED DESCRIPTION OF THE INVENTION

Water-cooled stator bars for electrical generators are comprised of a plurality of small rectangular solid and hollow copper strands which are brazed to one another and brazed to an end fitting. The end fitting serves as both an electrical and a hydraulic connection for the stator bar. The end fitting typically includes an enclosed chamber for ingress or egress of stator bar cooling liquid, typically deionized water. Another opening of the end fitting receives the ends of the strands of the stator bar, the fitting and peripherally outermost copper strands of the stator bar being brazed to one another. Over time, leaks have variously developed about the connection between the stator bar ends and the stator bar fitting as well as between adjacent strands. It is believed, based on leak analysis results, that the leak mechanism is due to a crevice corrosion process which initiates in the braze alloy at the interior surface of the braze joint. Crevice corrosion is initiated by changes in local chemistry within the crevice, such as shift to phosphorous acid conditions in the crevice.

There are also other leak issues in liquid cooled generators. Examples of other leaks in addition to the clip crevice corrosion leaks are clip crack leaks, clip window leaks, plumbing and fitting leaks, and connection ring leaks.

Field repair of leaks through the stator bar end connections has only been moderately successful.

In an embodiment of the invention, an electroplating method is proposed to deposit a thin layer of metallic barrier coating on the entire interior surface of liquid-cooled stator bars' water pass, or selectively on target areas, e.g., with high corrosion risks or otherwise having a high leak potential. The metallic layer provides a corrosion resistant barrier coating to prevent water access to corrosion susceptible region(s) such as clip-to-strand braze joints. Concurrently the coating has the capability to repair and prevent substantially all other types of leaks.

Figure 1:
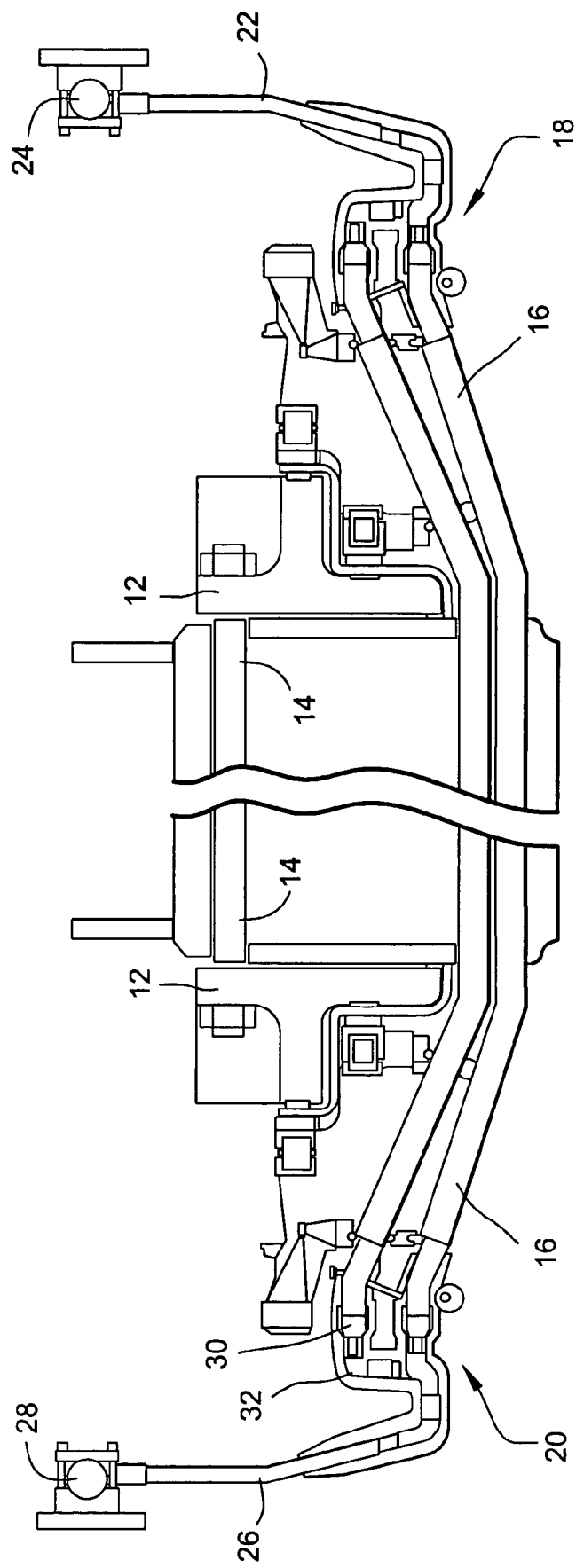
FIG. 1 is a schematic illustration of a liquid-cooled stator winding arrangement illustrating the stator bars and end fittings coupled to inlet and outlet coolant headers.

Referring now to the drawings, particularly to FIG. 1, there is illustrated a liquid-cooled stator winding arrangement used in a typical liquid-cooled generator. A stator core having stator core flanges 12 and core ribs 14 is illustrated, with stator bars 16 passing through radially extending slots and terminating at opposite ends in end fittings 18 and 20. Inlet hose 22 connects inlet fitting 18 to an inlet coolant header 24 and outlet hose 26 connects the outlet fitting 20 to an outlet coolant header 28. Each stator bar 16 includes a plurality of hollow and solid copper strands respectively disposed in side-by-side and superposed relation one to the other. The fitting, for example, fitting 20, includes a clip 30 formed of an electrically conductive material, such as copper. The clip comprises a body having a rectilinear opening at one end for receiving the strands of the stator bar 16. At the opposite end, there is provided an opening which in use is normally engaged with a copper tube 32 which serves as both an electrical connection and a hydraulic connection for flowing liquid coolant, e.g., deionized water, into or from the chamber 34 defined by the stator bar clip 30 and the exposed ends of the hollow and solid copper strands. The liquid in the chamber either flows into the fitting and through the hollow strands for cooling purposes when the fitting comprises an inlet fitting or receives the liquid coolant from the hollow strands for egress when the fitting is employed as an outlet fitting. As mentioned above, the solid and hollow strands are brazed to one another, and a cover is brazed to clip window. These junctions are among the potential sites for leaks over time.

In an embodiment of the invention, the interior of the stator bar clip 30, including the corrosion susceptible braze joint between the clip 30 and the stator bar 16, and the cover to clip braze seal, are electroplated so that a thin metallic layer is deposited on the entire interior surface. The metallic layer provides a corrosion resistant barrier coating to prevent water access to corrosion and/or leak susceptible region(s) such as the clip-to-strand braze joints and the cover-to-clip braze seal.

Figure 2:
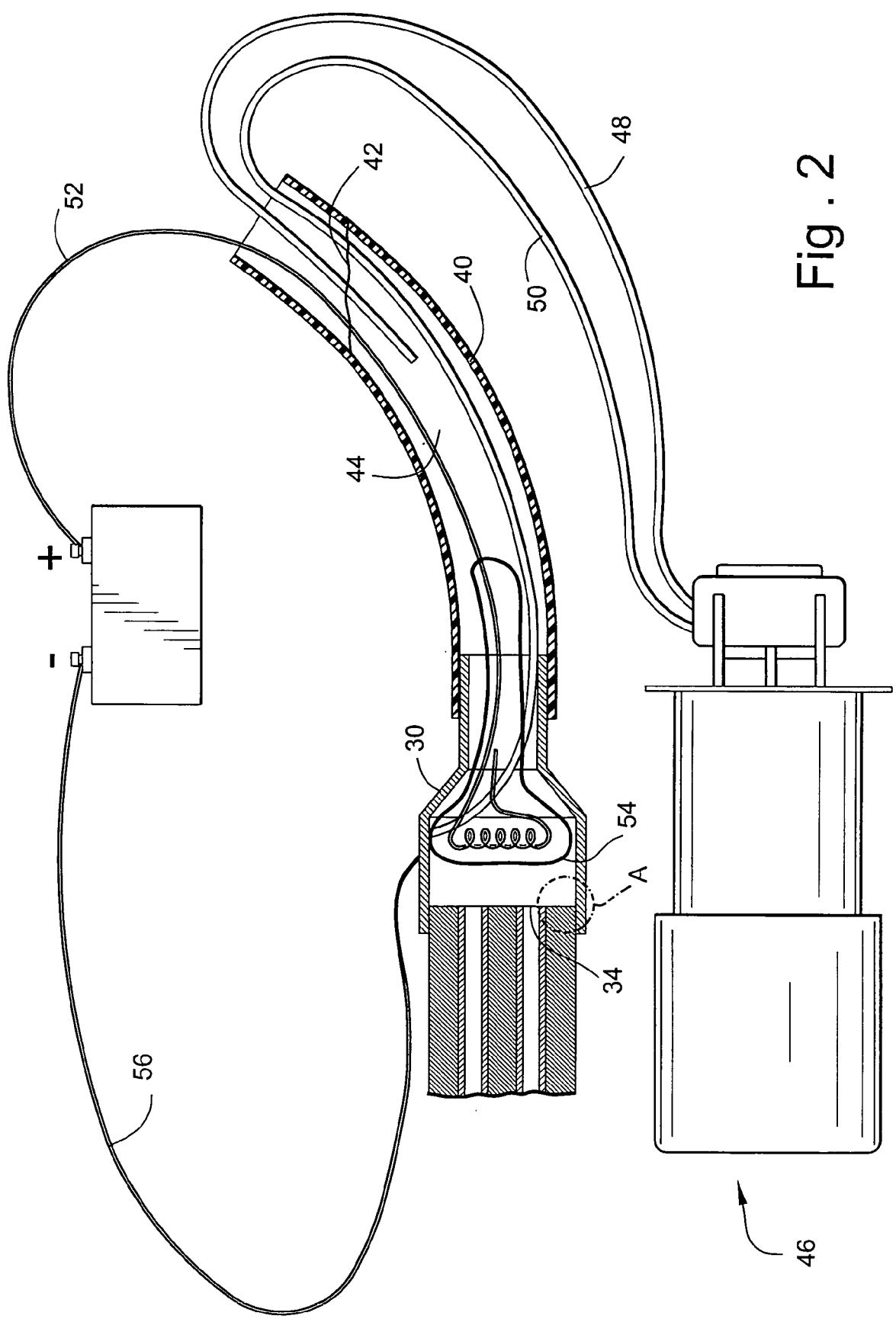
FIG. 2 is a schematic cross-section of a plating set-up for plating the interior of a component, such as a stator bar clip.

Electroplating is facilitated by isolating the target stator bar clip, including the braze joint between it and the stator bar, such as by partial disassembly to provide access to the end of the clip remote from the stator bar. Referring to FIG. 2, a suitable assembly for electroplating the stator bar clip is schematically illustrated by way of example. In the illustrated embodiment, plastic tubing 40 is securely coupled to the clip and extends up and away from the clip to define a plating solution bath upper surface 42 whereas the plating solution 44 will fill the chamber 34 defined by the stator clip. A pump 46 is provided to circulate plating solution 44 through the bath defined by the interior of the stator clip 30 and the interior of the tubing 40. The plating solution may be initially loaded to the clip interior through the tubing 40, or the pump can load the bath through inflow tube 48. In the latter case, a reservoir of plating solution (not shown) is provided and operatively coupled to the pump. In either case, recirculating flow tube 50 recirculates fluid to the pump (and reservoir, if any) and removes any gas, such as hydrogen bubbles, trapped against the uppermost portion of the clip interior. The resultant circulating flow advantageously promotes agitation.

In the embodiment illustrated in FIG. 2, the anode 52 is a length of 10 gauge insulated copper wire stripped for several inches and rolled into a coil to reduce its overall dimensions. Of course, a copper wire is just one example of a consumable metal source that may be provided as the anode. Other alternatives include a metal mesh structure. Electrical contact between the anode and the component being plated should of course not occur. Therefore, in an exemplary embodiment the anode is inserted into, e.g., a double walled porous bag 54 of non-conductive material to prevent electrical contact but to allow solution access. The anode is connected to a suitable poser supply (a 2–3 V DC power supply was used in a test apparatus). The device itself is electrically coupled to the power supply as a cathode, e.g., via contact 56.

Figure 3:
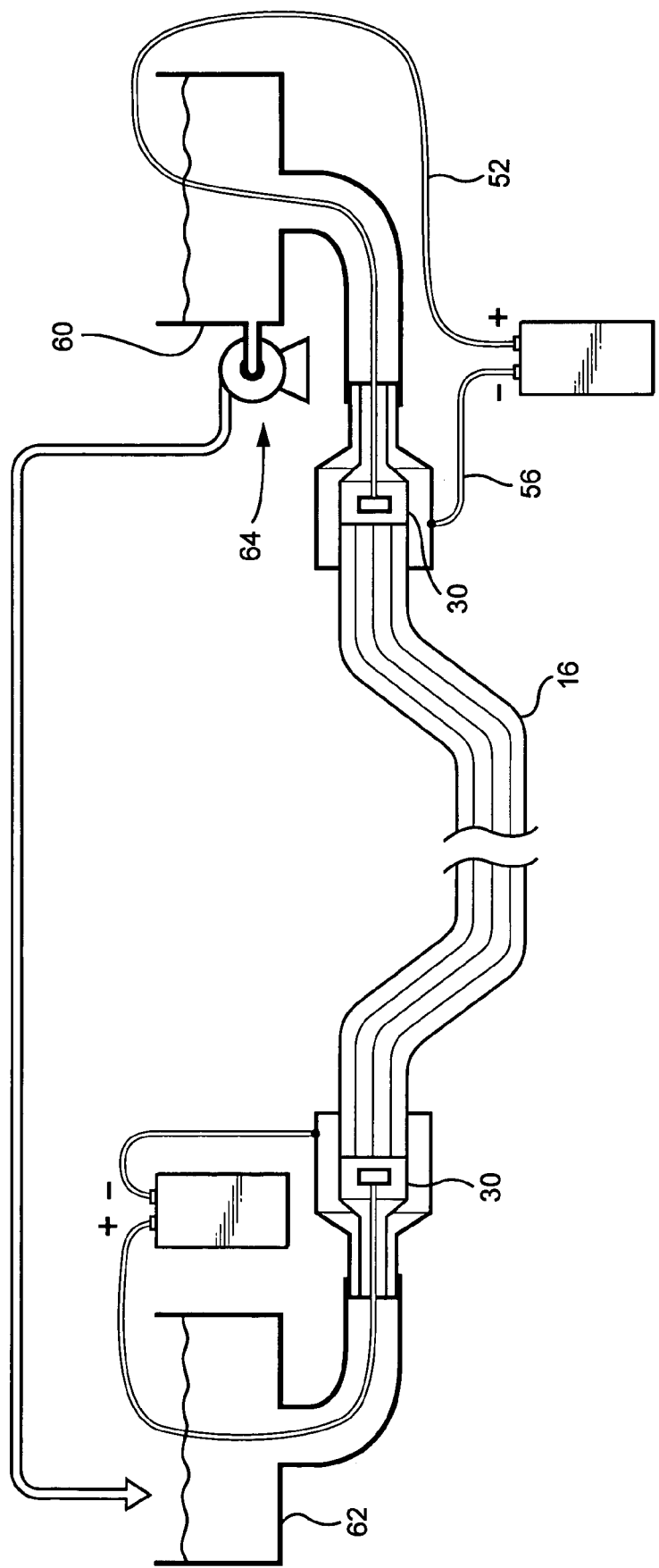
FIG. 3 is a schematic illustration of a plating set-up for simultaneous plating wherein the bar is flooded with circulating solution.

In the assembly illustrated in FIG. 2, the reservoir may be closed remote from the access tube. In the alternative, a recirculating system may be provided wherein the remote end is not closed, but instead the flow is through the clips 30 at each end of the stator bar(s), and the interior of both clips and the respective braze joints are plated simultaneously, as schematically illustrated in FIG. 3. In the illustrated embodiment, plating solution reservoirs 60, 62 are disposed in flow communication with each clip, and a pump 64 is provided to circulate the plating solution through the clips and bar 16.

Although not illustrated in detail, in practice the device is heated, e.g. with heating tape, to between 40 and 50° C. Heating may also be accomplished with an in-line heater in the electrolyte return tube.

An exemplary acid copper electroplating solution is a mixture of e.g., water, sulfuric acid, copper sulfate, and a trace of hydrochloric acid. To this mixture a number of organic constituents are added that serve to regulate and distribute the delivery of, e.g., copper to the surface being plated. The two basic organic additives are commonly referred to as the "brightener/leveler" and the "carrier".

An electroplating cell is typically comprised of a (non-metallic) container full of the electroplating solution in flow communication with the area or component surface to be treated and a source of plating metal ions, as the anode. In the illustrated embodiment, the electroplating cell is comprised of the component (clip 30) interior 34, the access tubing 40 interior volume, the inflow and outflow tubes 48,50, and the remote reservoir for the solution (if provided) and, as the anode, the coiled copper wire 52, or other consumable metal source, disposed within the access tubing 40 and/or clip 30. This ion supply must be capable of continuous sourcing into a near short circuit load. A typical copper electroplating bath has an effective full load operating "impedance" that ranges from 0.025 Ohms and 0.015 Ohms. The surface for receiving the electroplated coating, referred to as the cathode, in this case the clip, the stator bar, and the braze joint therebetween, is connected to the negative terminal of the current source. Deposition of, e.g., copper in this example, on the target component occurs when an electrical potential is established between the anode and the cathode (target component). The resulting electrical field initiates electrophoretic migration of copper ions from the anode to the electrically conductive surface of the cathode, where the ionic charge is neutralized as the metal ions plate out of solution. As a result, a uniform, thin coating of smooth, bright copper is deposited on the target surface(s).

It should be noted that if it is anticipated that air or evolved gas may become trapped, e.g., in a crevice or a blind recessed area, it will prevent plating in such areas and pressure treatment may be necessary. Pressure treatment may be applied by defining the water pass system as a closed loop that can be sealed and pressurized. Additionally, locating the return flow tube to draw fluid from the vertically upper portion of the stator clip, as mentioned above, facilitates the removal of trapped air or evolved gas to facilitate uniform plating.

Figure 4:
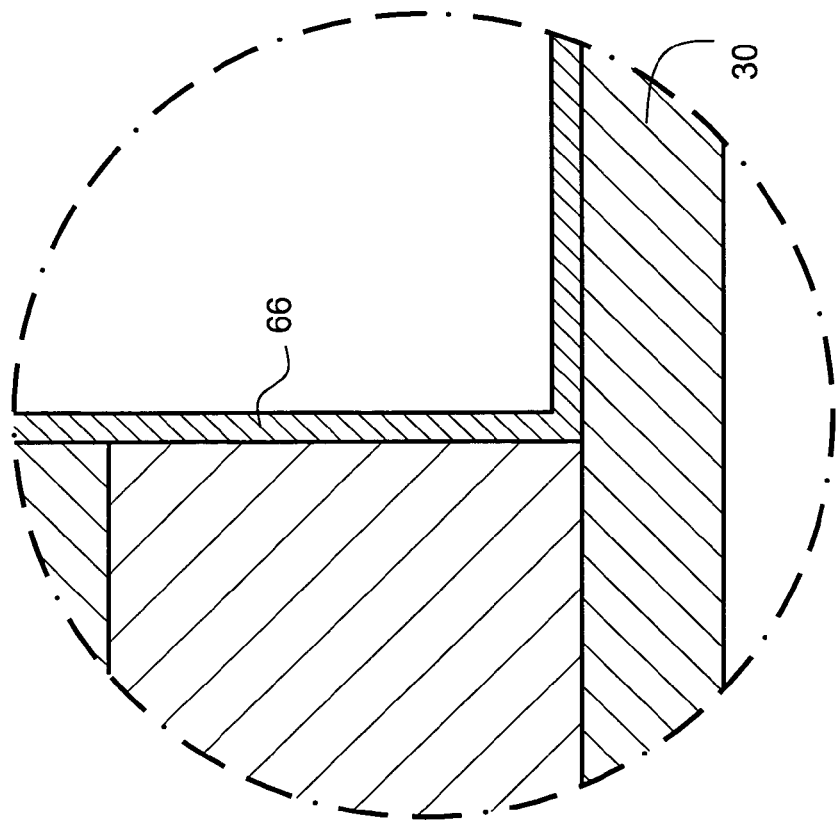
FIG. 4 is a schematic illustration of detail A of FIG. 2 for a plated end fitting chamber with a metallic layer.

The electroplating process is continued until a deposit layer 66 of about 1 to 3 mm is achieved, as schematically illustrated in FIG. 4. The process can be ceased at any time simply by disengaging the power source.

As an alternative to electroplating a single metal, the plating of the braze joint may be accomplished as a double-layered plating with a first plating followed by a second plating applied over the first plating layer. As will appreciated, a double layered plating provides enhanced durability as compared to a single layered plating particularly where the plating coatings have selective properties; for example, an underlying plated film having strong corrosion resistance and a second plated film applied for air tightness, durability and corrosion resistance.

Figure 5:
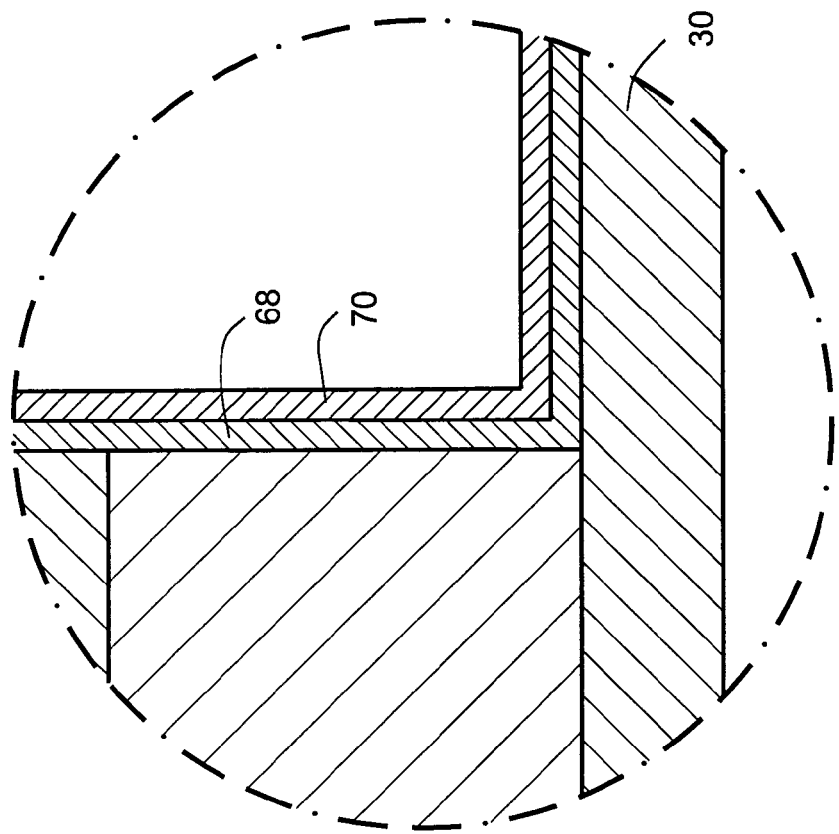
FIG. 5 is a schematic illustration of detail A of FIG. 2 for a plated end fitting chamber with multiple metallic layers.

As a further alternative, the water pass of the stator bars and/or the clips, for example, may be plated before assembly and then plating can again be carried out after assembly to plate the braze joints, to effectively provide a double layered plating 68, 70 in certain areas or on certain parts, as schematically illustrated in FIG. 5.

In accordance with this invention, all of the joints which have the potential for forming a leakage path are electroplated. In this way, the existing leak or leaks at the stator bar end connections of a generator in the field are repaired. Additionally, by providing a protective coating to all potential leakage paths of the joints, a seal is provided which will ensure against the formation of leakage paths in the future. That is, the electroplating not only isolates the liquid coolant from the brazing material and seals between the joints of adjacent strands and the outermost strands, but can be used to deposit a layer of material over, to seal, the entire interior surface of the coolant flow path, whereby all potential leakage paths are sealed to prevent future leaks. While the present invention is particularly applicable to field repairs of existing generators, it may also be applied to generators during initial manufacture to provide protection against future leakage.

As noted above, since the method disclosed herein is capable of applying a coating over the entire wetted surface of the flow system, the method can address the clip crevice corrosion leak issue and also other leak issues in liquid cooled generators. For example, the method embodying the invention may used to address clip crack leaks, clip window leaks, plumbing and fitting leaks, and connection ring leaks. Thus, while the invention has been described in connection with what is presently considered to be the most practical and preferred embodiment, it is to be understood that the invention is not to be limited to particulars of the disclosed embodiment, but on the contrary, is intended to cover various modifications and equivalent arrangements included within the spirit and scope of the appended claims.

What is claimed is:

1. A stator bar end and a fitting receiving the end to define a seal substantially impermeable to liquid, the fitting having a chamber for receiving a liquid through an opening in the fitting and in communication with hollow strands forming at least a portion of said stator bar and for flow of the liquid through the hollow strands, wherein at least a portion of an interior surface of said fitting has a metallic layer disposed thereon, wherein said metallic layer is deposited by electroplating,
    wherein said metallic layer has a thickness of about 1 to 3 mm, and
    wherein said metallic layer is disposed to overlie a junction between said stator bar end and said fitting.

2. A stator bar end and a fitting receiving the end to define a seal substantially impermeable to liquid, the fitting having a chamber for receiving a liquid through an opening in the fitting and in communication with hollow strands forming at least a portion of said stator bar and for flow of the liquid through the hollow strands, wherein at least a portion of an interior surface of said fitting has a metallic layer disposed thereon, wherein said metallic layer is deposited by electroplating,
    wherein said metallic layer comprises a first electroplated metallic layer covered by a second electroplated metallic layer over the first electroplated layer and wherein said first and second plated layers are comprised of different metals, and
    wherein said first and second electroplated metallic layers are disposed to overlie a junction between said stator bar end and said fitting.

* * * * *